United States Patent [19]
Colvin et al.

[11] Patent Number: 5,415,222
[45] Date of Patent: May 16, 1995

[54] MICRO-CLIMATE COOLING GARMENT

[75] Inventors: David P. Colvin, Apex; Yvonne G. Bryant, Raleigh, both of N.C.

[73] Assignee: Triangle Research & Development Corporation, Triangle Park, N.C.

[21] Appl. No.: 158,897

[22] Filed: Nov. 19, 1993

[51] Int. Cl.⁶ .............................................. F28F 7/00
[52] U.S. Cl. ................................. 165/46; 62/259.3; 165/136; 165/902
[58] Field of Search ............... 165/46, 902, 135, 136; 2/69, 81; 62/259.3, 530

[56] References Cited
U.S. PATENT DOCUMENTS

| | | | |
|---|---|---|---|
| 3,289,748 | 12/1966 | Jennings | 165/46 |
| 3,610,323 | 10/1971 | Troyer | 165/46 |
| 3,744,053 | 7/1973 | Parker | 165/46 |
| 4,706,672 | 11/1987 | Jones | 62/259.3 |
| 4,856,294 | 8/1989 | Scaringe | 165/46 |
| 5,263,336 | 11/1993 | Kuramarohit | 62/259.3 |
| 5,320,164 | 6/1994 | Szczesuil | 165/46 |

*Primary Examiner*—Ira S. Lazarus
*Assistant Examiner*—Daniel J. O'Connor
*Attorney, Agent, or Firm*—Rosenthal & Putterman

[57] ABSTRACT

The invention relates to a cooling garment, preferably in the form of a vest that contains pouches containing a phase change material. The pouches cover less than the surface area of the vest to thereby permit evaporative cooling to occur and to contribute to the overall comfort of the wearer. An alternate embodiment includes a honeycomb structure which is contained within the pouches and which contains a macroencapsulated phase change material and allows the escape of perspiration through the garment. A heat transfer fluid is adapted to circulate throughout the pouches. The honeycomb structure is designed so that the macroencapsulated phase change material remains within designated ones of the honeycombs, but that permits the flow of the heat transfer fluid through the pouch.

20 Claims, 7 Drawing Sheets

MICRO-CLIMATE COOLING GARMENT

FIELD OF THE INVENTION

This invention relates generally to the field of individual cooling garments and more particularly to individual cooling garments that maintain the surface and core body temperatures of the wearer at a relatively cool temperature for an extended period of time upon exertion.

BACKGROUND OF THE INVENTION

Micro-climate cooling garments are known for maintaining workers in high temperature environments at a temperature below the environmental temperature in order to enable the worker to operate within the environment for an extended period of time in order to accomplish a desired task.

One such micro-climate cooling garment is disclosed in U.S. Pat. No. 4,856,294 to Scaringe et al. which discloses a micro-climate cooling system in the form of a self-contained vest comprising a vest-type garment having an interior cross-section of a double wall construction. The portion of the vest that is proximate the body is selected so as to be compatible with the skin of the wearer and the internal portion which forms a sealable pocket which contains a heat exchange or thermal energy transfer material that changes phase from a solid to a liquid within a range of body temperatures. While somewhat effective in accomplishing its intended purpose of cooling the wearer, the Scaringe et al. garment is not without its inherent drawbacks and disadvantages. For example, the Scaringe et al. vest is a solid stiff vest, covering generally the entire torso of the wearer. As a result, the wearer tends to sweat profusely while wearing the vest and perspiration cannot escape through the garment. This can result in an increase in the weight of the user, as the perspiration will most likely be captured by the garment or by the clothing of the wearer. In addition, the failure of the garment to breathe, can result in the wearer developing hypothermia. Furthermore, the Scaringe et al. vest completely ignores the fact that almost seventy five per cent of resting metabolic heat production is eliminated by convection and radiation and that sweating and evaporation are therefore the keys to heat rejection at higher levels of heating. The Scaringe et al. garment also fails to take into account that discomfort occurs when the area of the sweat-moistened body approaches forty per cent and that to transfer sufficient heat for comfort, a 1–4 degree centigrade thermal gradient is necessary between the deep core body temperature and the surface skin temperature. For deep core temperatures higher than 39 degrees centigrade and corresponding skin temperatures above 36 degrees centigrade, the risk of heat exhaustion increases. For the foregoing reasons the Scaringe et al. vest is not preferred, nor currently used by the military.

Another micro-climate cooling garment in the form of a vest is the so-called "Steele" vest which is specifically designed for military applications. The Steele vest is a one-piece design that can be slipped over the head of the wearer. Hook and loop side straps cinch the garment to improve contact with the body. Normally, the undergarment is worn over a T-shirt, but it may be worn over a military uniform in a NBC (nuclear, biological, chemical) protective suit. The Steele vest has six pockets (three over the front chest and another three across the back). Each pocket can hold a segmented three-element thermostrip of the blue gel PCM (phase change material) to facilitate fit to the human torso. The blue PCM employed in the Steele vest is a thin mixture of cornstarch and water. A sample of the Steele PCM was placed in a super-cold freezer and it was observed that the temperature of the PCM had to be lowered to below −20 degrees centigrade in order to freeze it. The PCM in the Steele vest melts over a range of −5 degrees centigrade to approximately 8 degrees centigrade. During testing it was noted by the inventor that the PCM packets had to be insulated from contact with the body to prevent frostbite and discomfort, factors which are believed to reduce the garment's effectiveness. Another disadvantage of the Steele vest is that the PCM, once melted must be re-frozen or re-solidified at approximately −25 degrees centigrade in order to remove the 55 cal/gram of latent energy stored before re-solidification. Thus, freezing the Steele PCM mixture to −15 degrees centigrade would not significantly rejuvenate it. In view of the foregoing, it would be commercially valuable to be able to provide a PCM that could be placed in direct or near direct contact with the skin in order to obtain maximum cooling power from the PCM. In addition, it would be a significant improvement over the prior art to provide a PCM that could be easily rejuvenated in the field without any special apparatus.

It is accordingly an object of the present invention to provide a micro-climate cooling garment that overcomes the above noted problems associated with the prior art devices, and which is comfortable.

More particularly, it is an object to provide a micro-climate cooling garment in the form of a vest that may be brought into direct or close contact with the skin of the wearer without causing frostbite or discomfort.

Another object of the present invention is to provide a microclimate cooling garment in the form of a vest that allows escape of perspiration from beneath the garment.

Yet another object of the present invention is to provide a micro-climate cooling garment in the form of a vest that may be recharged without any special apparatus.

Still another object of the present invention is to provide a micro-climate cooling garment in the form of a vest that provides freedom of movement to the wearer while closely conforming to the body shape of the wearer to provide maximum heat transfer between the vest and the wearer.

A still further object of the present invention is to provide a micro-climate cooling garment in the form of a vest that maintains a relatively uniform distribution of the phase change material while in the liquid state.

SUMMARY OF THE INVENTION

In accordance with the present invention, there is provided a vest for maintaining the temperature of a wearer in a stable condition, which is characterized by its ability to closely conform to the body of the wearer and to effectively thermally insulate and conduct thermal energy. The garment takes the shape of a generally rectangular sheet of flexible breathable material with side edges and end edges, and the sheet includes an opening in a medial location to define front and rear panels on opposite sides of the opening. The sheet may thus be positioned on a wearer, with the wearer's head extending through the opening, and the front and rear panels respectively overlying the chest and back of the wearer. Pockets are located in each of the respective front and rear panels and respective cavities are defined therein.

A sealed pouch containing a temperature stabilizing means is adapted to be removably inserted within each of the respective pockets. The sealed pouch contains a phase change material, preferably selected from the group of paraffinic hydrocarbons. In one embodiment of the invention, the pouches are fabricated from a waterproof material such as rubber coated NYLON fabric so that when the bulk PCM changes phase to the liquid state, it is contained within the pouch. In another embodiment of the invention, the PCM is macroencapsulated within glass or polymer beads. The macroencapsulated PCM is then dimensionally stabilized within pouches that are fabricated from a mesh material. In either case, the PCM does not completely fill the pouch or the capsule and an air space is maintained to accommodate the expansion of the PCM when in the liquid state to prevent rupture of the container.

BRIEF DESCRIPTION OF THE DRAWINGS

Some of the features and advantages of the invention having been briefly stated, others will appear from the detailed description which follows, when taken in connection with the accompanying drawings, in which.

DETAILED DESCRIPTION OF THE PREFERRED EMBODIMENTS

Figure 1:
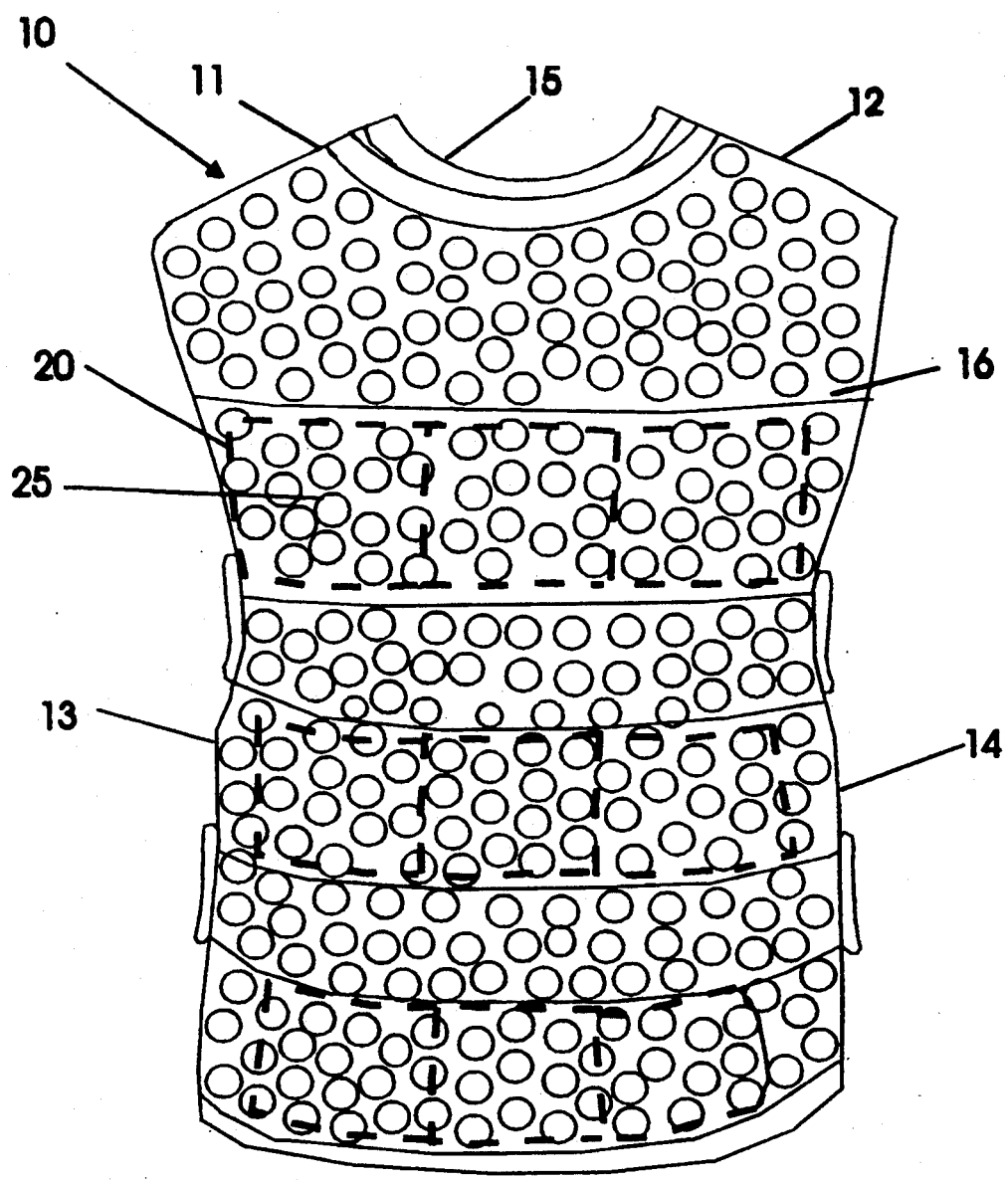
FIG. 1 is a front view of the vest cooling garment according to the present invention.
Figure 2:
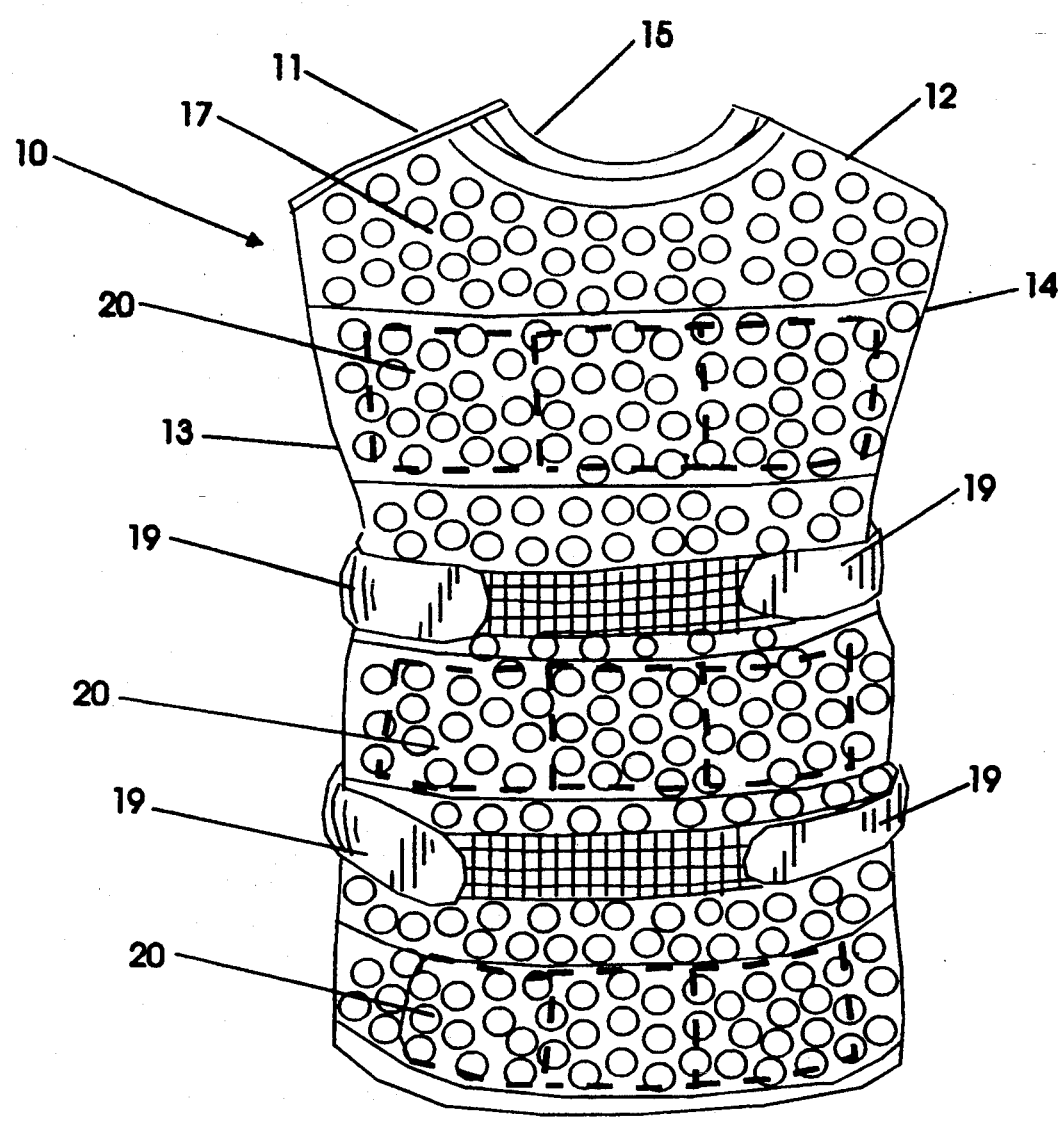
FIG. 2 is a rear view of the vest cooling garment according to the present invention.

While the present invention will be described more fully hereinafter, it is to be understood at the outset that persons of skill in the art may modify the invention herein described while still achieving the favorable results of this invention. Accordingly, the description which follows is to be understood as a broad teaching disclosure directed to persons of skill in the appropriate arts, and not as limiting upon the present invention.

Referring more particularly to the drawings, and particularly to FIGS. 1 through 4, a cooling vest which embodies the features of the present invention is indicated generally at 10. The garment 10 is adapted to cover the upper portion of the wearer's body, and it is effective to cool the wearer as will be more fully explained hereinbelow.

The vest 10 comprises a generally rectangular sheet of flexible breathable material. The generally rectangular sheet has opposite end edges 11,12 and opposite side edges 13, 14. The sheet further includes an opening 15 in a medial location to define front and rear panels 16,17 respectively on opposite sides of the opening 15 so that the sheet is adapted to be positioned on a wearer with the wearer's head extending through the opening and with the front and rear panels respectively overlying the chest and back of the wearer.

Figure 3:
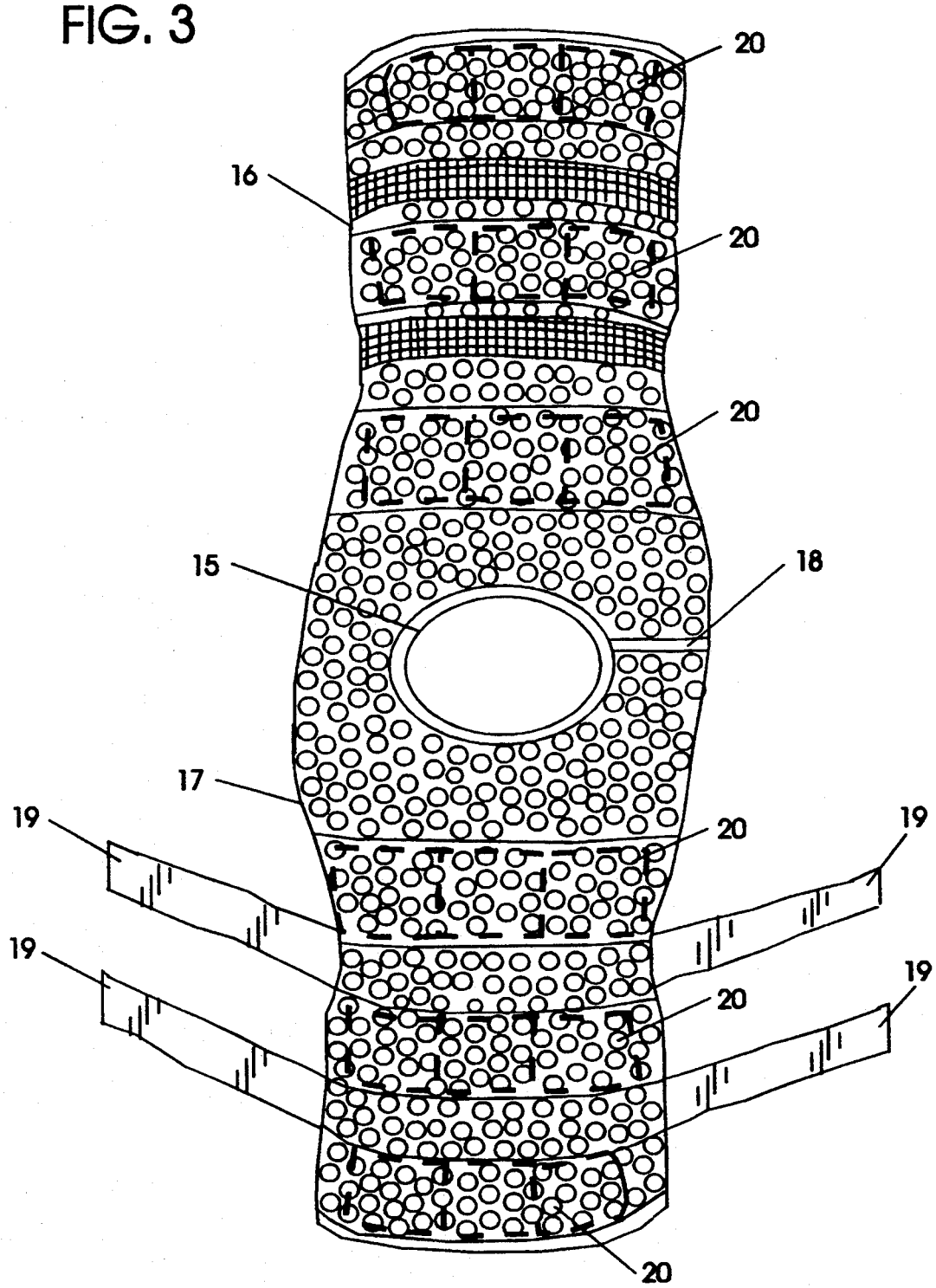
FIG. 3 is a top view of the vest cooling garment in a flattened condition view from the outside.
Figure 4:
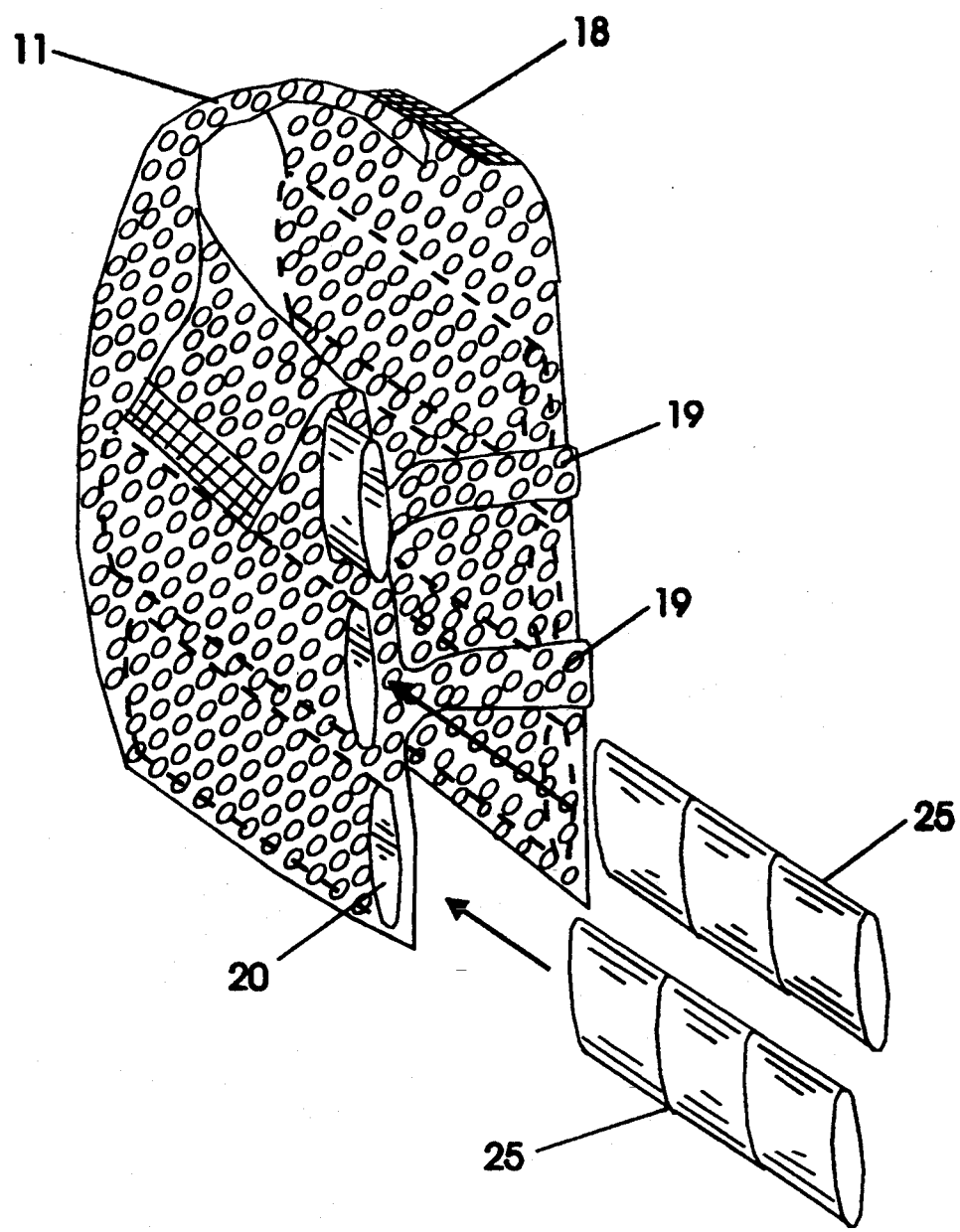
FIG. 4 is a perspective view of the vest cooling garment illustrating the PCM containing pouches being inserted within the pockets.
Figure 5:
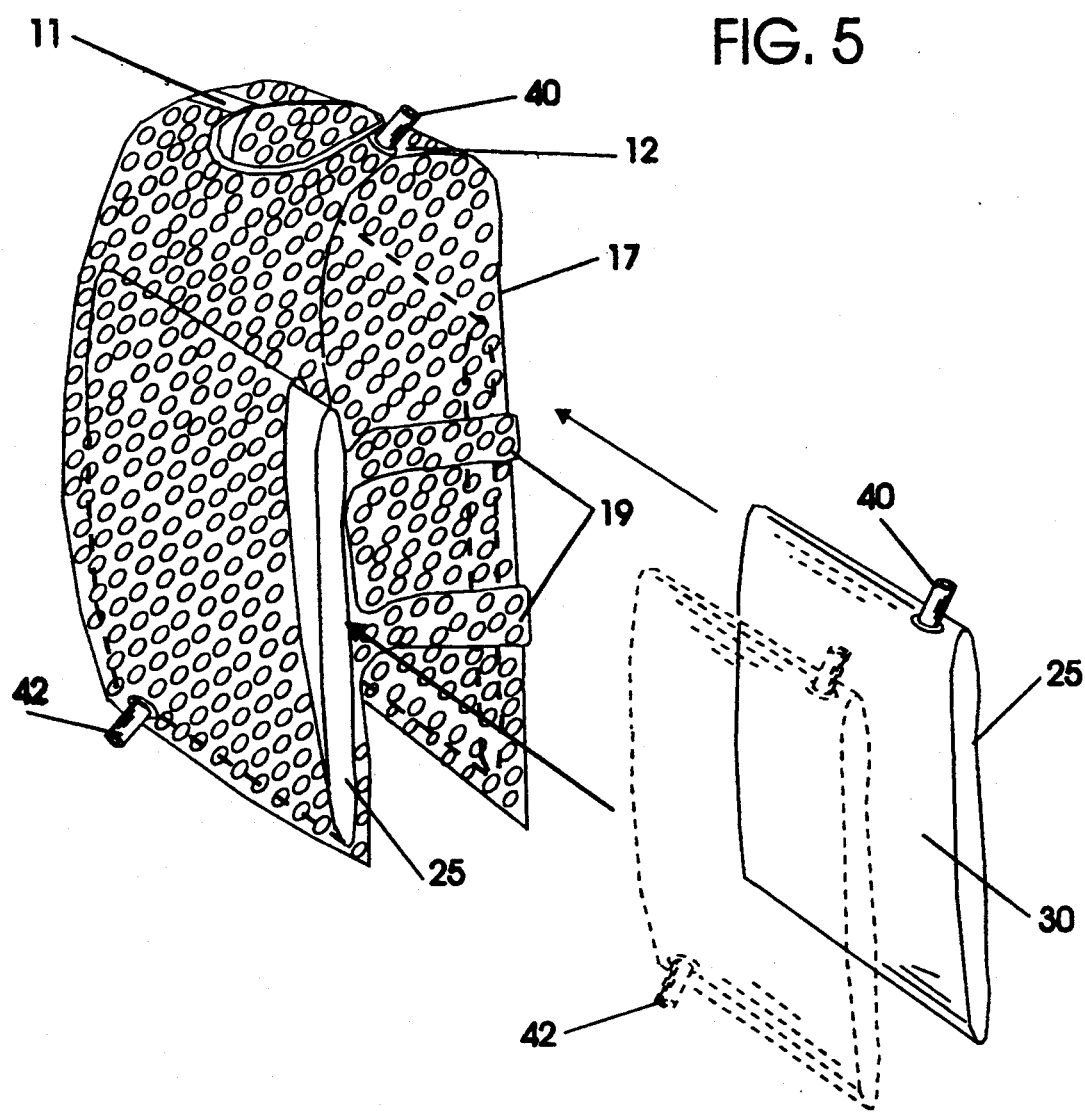
FIG. 5 is a perspective view of an alternate embodiment of the vest cooling garment that employs a fluid circulating though the pouches and showing the pouches being inserted into the vest shell.
Figure 6:
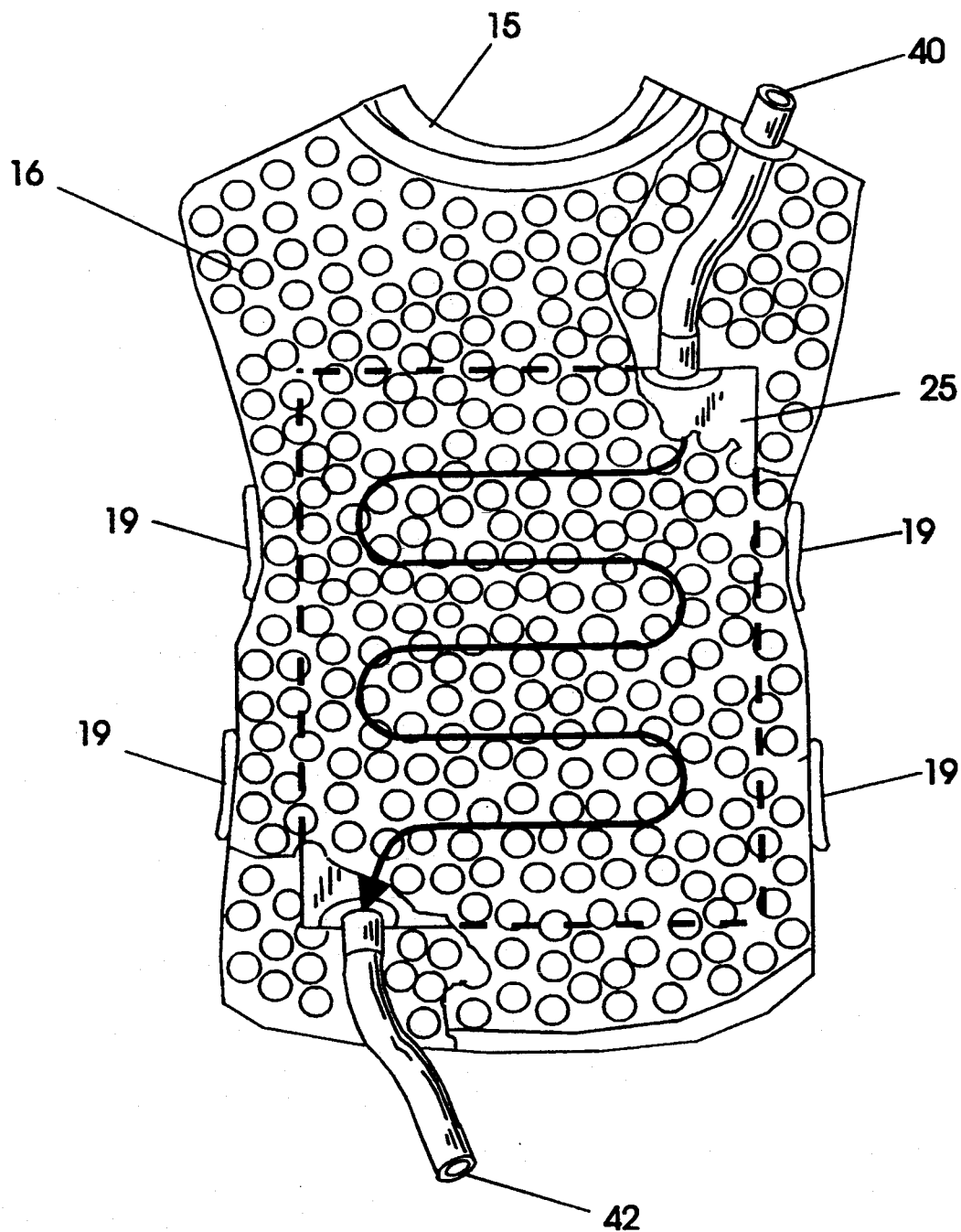
FIG. 6 is a front view of the alternate embodiment of the vest cooling garment showing the pouch inserted into the shell and schematically illustrating a fluid flow path through and around the PCM.

As illustrated in the figures, the front and rear panels are formed from separate pieces of a mesh material such as NYLON or polypropelene. For ease of entry, the panels are sewn together along one pair of contiguous edges that overly one of the shoulders. The other pair of contiguous edges are adapted to be held together by means of hook and loop fasteners 18 as shown in FIG. 4. The front and rear panels 16, 17 are adapted to closely conform to the shape of the wearer. As best illustrated in FIG. 3, strap means or side straps 19 extend from the side edge 13 and are adapted to be connected to the side edge of the opposite panel, again by hook and loop fasteners (not shown). In this manner, the vest is provided with additional flexibility as depending on the waistline of the wearer, close conformity with the body of the wearer can be assured to maximize thermal transfer.

Each of front and rear panels, 16, 17 includes a plurality of pocket means or pockets 20 defining respective cavities. In the embodiment illustrated in FIGS. 1 through 4, three pockets 20 extend substantially across the entire width of the vest. The pockets are spaced apart from each other in order to provide spaces through which evaporation of moisture in the form of perspiration may occur. It will be noted that while the drawings illustrate three pockets in a specific location, that the present invention will operate with equal efficacy with other pocket arrangements so long as adequate provision is made to provide evaporation of the perspiration produced by the wearer during use. The end of each of the pockets 20 is also provided with appropriate means to close the pocket such as hook and loop fasteners, zippers or buttons and button holes (not shown).

A sealed pouch 25 containing a temperature stabilizing means 30 is provided and is adapted to be removably inserted within each of the respective pockets 20. Each of pouches 25 contains a phase change material which is preferably a bulk paraffin. As a group paraffins are non-toxic, relatively inexpensive and can be contained with plastic films. The table below lists a number of bulk paraffinic compounds, whose number of carbon atoms dictate where the phase change temperature is likely to be found.

| COMPOUND NAME | NUMBER OF CARBON ATOMS | MELTING POINT DEGREES CENTIGRADE |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |

-continued

| COMPOUND NAME | NUMBER OF CARBON ATOMS | MELTING POINT DEGREES CENTIGRADE |
| --- | --- | --- |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Each of the materials is most effective near the melting point indicated. It will be seen from the foregoing that the effective temperature range of the pouch can therefore, be tailored to a specific environment by selecting the phase change materials required for the corresponding temperatures and placing the phase change material therein.

The pouches are fabricated from an elongate piece of coated NYLON fabric, such as is used in life rafts. Sealing was accomplished by conventional RF sealing techniques, with care being taken to leave some air in each segment in order to prevent rupture during the liquid phase at which time the PCM expands. Each pouch was divided into three segments, with each pouch being sealed and each segment thereof being sealed from the others. The segments are shaped so as to roughly conform to the shape of the body. The total weight of the PCM filled pouches is approximately 6.5 to 7.5 pounds.

In an alternate embodiment of the invention, the PCM rather than being sealed into the pouches as bulk material, the PCM may be macroencapsulated into macrocapsules on the order of about 0.10 inch to 0.50 inch in diameter. Macroencapsulation by conventional techniques such as roll-coating is well known and a detailed discussion thereof is not deemed necessary. In this embodiment, the macrocapsules are contained within a pouch as described above, however, it is not necessary that the pouch be sealed. Indeed it is preferable that the pouch in this instance be fabricated from a flexible breathable material such as a woven fabric. This provides additional opportunity for perspiration to escape from the garment and to enhance the efficiency of the garment by permitting evaporative cooling to occur in addition to cooling as the result of the PCM undergoing a phase change. While not illustrated, it is believed that when macroencapsulated PCM is used, that the pouches containing the same may cover a greater percentage of the surface area of the vest without sacrificing cooling efficiency.

In operation, the user would place the appropriate PCM filled pouches 25 into the respective pockets 20, with care being taken to ensure that the PCM is in the solid state. The user would then insert his head through the opening 15 so that the vest rests on his shoulders. Side straps 19 are then tightened so that the vest is in comfortable and good thermal contact with the various portions of the torso. Depending on the temperature gradient between the body of the wearer and the PCM as well as other factors such as relative humidity of the atmosphere and the degree of exertion of the wearer, the wearer can expect to experience significant cooling effects for periods of about two to four hours. When the phase change is complete, the pouches can be removed and either re-charged or fresh pouches inserted. Re-charging and rejuvenation of the paraffinic hydrocarbons can be accomplished by any one of a number of methods. Perhaps the simplest method is the placement of the liquid filled PCM pouches into an air conditioned room. In the event that conditions do not permit the foregoing, the PCM may be refrozen by wrapping the pouch in a water saturated cloth and subsequent placement of the pouch in a shaded location. Experiments were conducted with n-Octadecane and showed significant rejuvenation of the PCM even in an environment where the ambient air temperature was 100 degrees F. In another experiment, the n-Octadecane PCM packets were tested in a desert-like environment. The spent (liquified) PCM packets were buried in the sand at a depth of 2.5 feet and it was shown that they readily returned to the frozen state.

Another embodiment of the invention is illustrated in FIGS. 5 through 8. In this embodiment the vest 10 is modified to operate under conditions where greater heat rejection (removal) is required and further where the garment may be connected to a circulating fluid.

Structurally, the supporting sheet of the vest 10 is substantially identical to that described above. Differences occur in the pouches 25 which are now fabricated from a waterproof material and which now include fluid flow channels. The figures illustrate only one pouch 25 being inserted into a pair of vest pockets 20. However, in the discussion which follows it will be understood that several pouches could be provided which would all be linked together to provide a fluid flow channel with the auxiliary cooling fluid entering the vest near the shoulder inlet and exiting at the lower end.

Figure 7:
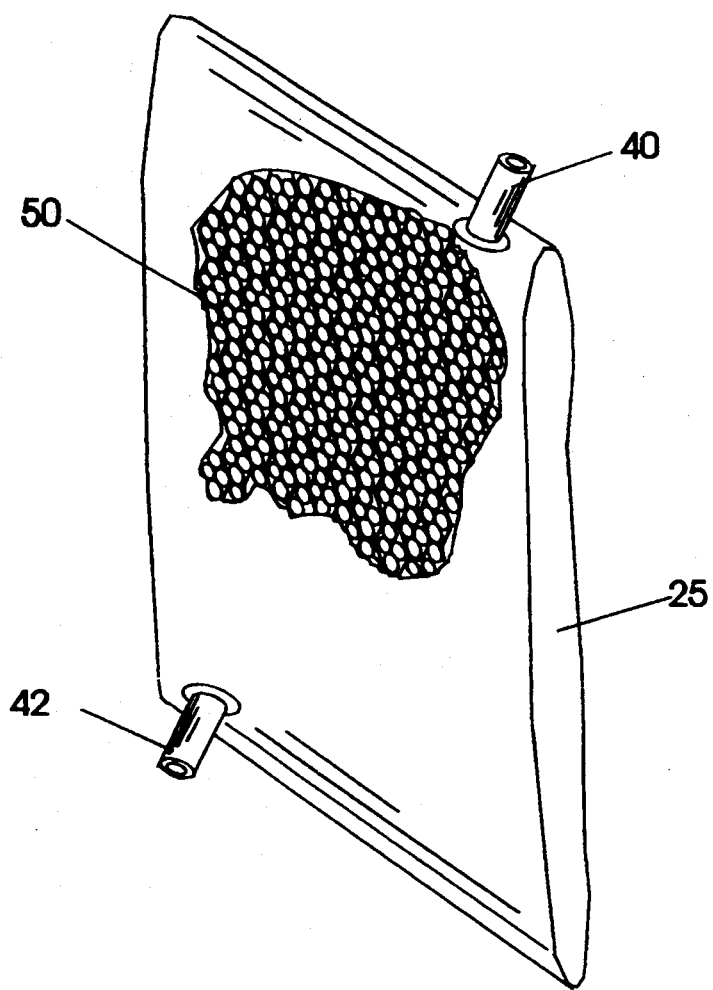
FIG. 7 is a perspective view of one of the pouches, partially broken away and showing the honeycomb matrix that maintains the PCM macrocapsules in position.
Figure 8:
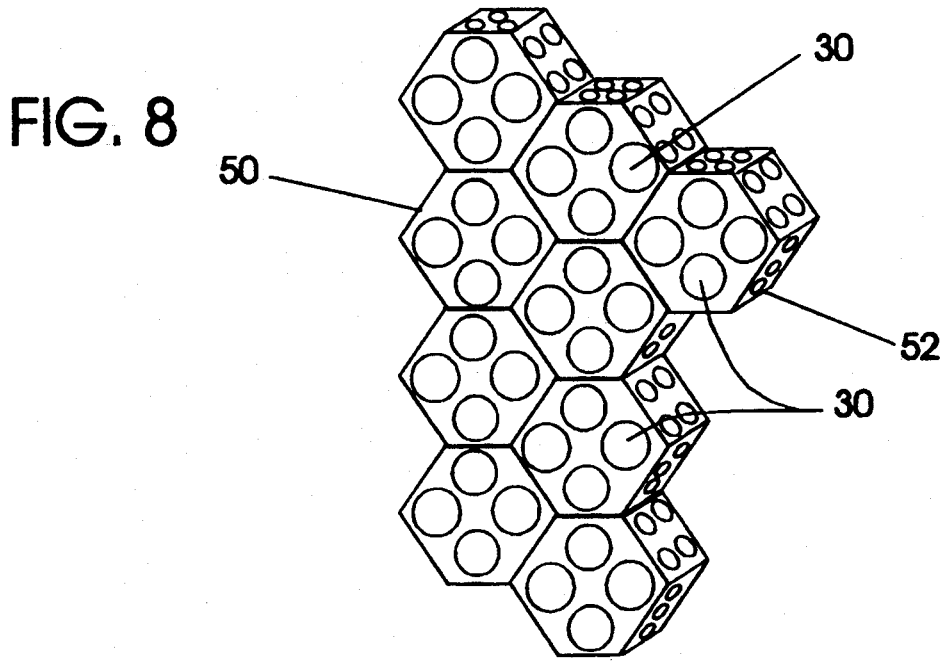
FIG. 8 is a perspective view of a portion of the honeycomb matrix and showing the macroencapsulated PCM positioned therein.

Referring now specifically to FIGS. 7 and 8, one of the pouches is there illustrated. The pouch may fabricated from a flexible waterproof material such as the life raft materials discussed above. The pouch includes an inlet end 40 defining a channel in fluid communication with the interior of the pouch and an outlet end 42 defining an outlet channel in fluid communication with the interior of the pouch. The respective inlet and outlet ends each are adapted to be connected to tubing 44 that would carry the heat transfer fluid.

Disposed within the pouch 25 is a channelling means 50 which takes the form of a honeycomb matrix into which the macrocapsules are inserted. The matrix is preferably fabricated from a strong flexible material such as a combination of urethanes/polyurethanes with an appropriate elastomer mixed in. This provides the needed flexibility for the vest to flex with the body movements of the wearer. The discussion which follows will describe in detail only one of the honeycomb structures, however, the reader will note that all of the other honeycomb structures will operate similarly. The honeycomb is sized so as to receive a plurality of the previously discussed macrocapsules and includes a number of openings 52 in each of its side walls. The openings are dimensionally smaller than the macrocapsules and prevent movement of the macrocapsules between honeycomb chambers while still permitting movement of the heat transfer fluid through the pouch and out the outlet end 42 to a heat exchanger (not shown). In addition, provision should be made for a covering such as a fine wire or plastic mesh material to be connected (by suitable means such as by glue or ultrasonic bonding methods) to the upper and lower surfaces of the honeycomb to hold the macrocapsules within the desired individual honeycomb chambers.

In operation, the wearer would place his head through the large medial opening with the vest overlying his shoulders. The side straps 19 are then tightened to provide a snug fit against the torso. The heat exchange fluid source would then be connected to the inlet end and the outlet end of each of the pouches via appropriate tubing and the heat transfer fluid circulated therethrough by means of a pump (not shown) or by other suitable means such as gravity feeding, should the application permit. In this manner, the macrocapsules can act as a thermal capacitor storing thermal energy during peak load periods which may be subsequently removed when the load is in an off-peak state.

It will be noted that the effective operating temperature range of the vest may be altered by varying the phase change material selected. For example, n-Eicosane may be appropriate for one environment and n-Octadecane may be most suitable for another environment. Such a substitution is easily and simply accomplished by interchanging PCM pouches. Another benefit of the present invention is that since the PCM is separately contained within sealed pouches or macrocapsules, a plurality of PCM's may be combined into a single garment when required for a specific application. The operating temperature zone may also be expanded by combining into one garment PCM's having melting temperatures close together.

The foregoing embodiments and examples are to be considered illustrative, rather than restrictive of the invention, and those modifications which come within the meaning and range of equivalence of the claims are to be included therein.

That which is claimed is:

1. A vest for maintaining the temperature of a wearer in a stable condition, which is characterized by its ability to closely conform to the body of the wearer and to effectively thermally insulate and conduct thermal energy, and comprising:
   a generally rectangular sheet of flexible breathable material having opposite end edges and opposite side edges, said sheet including an opening in a medial location to define front and rear panels on opposite sides of the opening so that said sheet is adapted to be positioned on a wearer with the wearer's head extending through said opening with the front and rear panels respectively overlying the chest and back of the wearer;
   at least one pocket means located in each of said respective front and rear panels and defining respective cavities;
   a sealed pouch containing a temperature stabilizing means adapted to be inserted within each of said respective pocket means, whereby the wearer of the vest is substantially maintained at a predetermined temperature for an extended period of time.

2. The vest according to claim 1 wherein said temperature stabilizing means comprises a phase change material.

3. The vest according to claim 2 wherein said phase change material comprises a paraffinic hydrocarbon selected from the group consisting of n-Octacosane, n-Heptacosane, n-Hexacosane, n-Pentocosane, n-Tetracosane, n-Tricosane, n-Docosane, n-Homeicosane, n-Eicosane, n-Nonadecane, n-Octadecane, n-Heptadecane, n-Hexadecane, n-Pentadecane, n-Tetradecane, and n-Tridecane.

4. The vest according to claim 1 wherein said flexible, breakable material comprises a mesh.

5. The vest according to claim 1 wherein said temperature stabilizing means comprises a plurality of microcapsules containing a phase change material, and further wherein said microcapsules are retained within said sealed pouch which is comprised of a flexible breathable material that permits air circulation through said pouch and around said microcapsules.

6. The vest according to claim 5 wherein said microcapsules range in diameter from about 0.10 inch to about 0.50 inch.

7. The vest according to claim 5 wherein said phase change material comprises a paraffinic hydrocarbon selected from the group consisting of n-Octacosane, n-Heptacosane, n-Hexacosane, n-Pentocosane, n-Tetracosane, n-Tricosane, n-Docosane, n-Homeicosane, n-Eicosane, n-Nonadecane, n-Octadecane, n-Heptadecane, n-Hexadecane, n-Pentadecane, n-Tetradecane, and n-Tridecane.

8. The vest according to claim 5 wherein each of said pouches is divided into a plurality of discrete segmented sections, each of which is sealed from the others and each of which is movable with respect to the others, whereby the pouches more closely conform to the body of the wearer.

9. A vest for maintaining the temperature of a wearer thereof in a stable condition, which is characterized by its ability to closely conform to the body of the wearer and to effectively thermally insulate and conduct thermal energy, and comprising:
   a generally rectangular sheet of a flexible, breathable material having opposite end edges and opposite side edges, said sheet including an opening in a medial location to define front and rear panels on opposite sides of the opening so that said sheet is adapted to be positioned on a wearer with the wearer's head extending through said opening with the front and rear panels respectively overlying the chest and back of the wearer;
   a plurality of spaced apart pocket means located in each of said respective front and rear panels, and defining a plurality of pockets;
   a sealed pouch containing a temperature stabilizing means adapted to be removably inserted within each of said respective pocket means,
   whereby the wearer of the vest is substantially maintained at a predetermined temperature for an extended period of time.

10. The vest according to claim 9 wherein each of said sealed pouches is divided into a plurality of discrete segmented sections, each of which is sealed form the others and each of which is movable with respect to the others,
   whereby the sealed pouches more closely conform to the body of the wearer.

11. The vest according to claim 1 wherein each of said discrete sealed segments contains at least some gas, whereby melting of the phase change material is accommodated by compression of said gas.

12. The vest according to claim 9 wherein the ratio of the surface of said pocket means to the ratio of the total surface area of said vest is less than about 90 per cent.

13. The vest according to claim 9 wherein said temperature stabilizing means comprises a phase change material.

14. The vest according to claim 5 wherein said phase change material comprises a paraffinic hydrocarbon selected from the group consisting of n-Octacosane, n-Heptacosane, n-Hexacosane, n-Pentocosane, n-Tetracosane, n-Tricosane, n-Docosane, n-Homeicosane, n-Eicosane, n-Nonadecane, n-Octadecane, n-Heptadecane, n-Hexadecane, n-Pentadecane, n-Tetradecane, and n-Tridecane.

15. A vest for maintaining the temperature of a wearer in a stable condition, which is characterized by its ability to closely conform to the body of the wearer and to effectively thermally insulate and conduct thermal energy and comprising:
- a generally rectangular sheet of flexible breathable material having opposite end edges and opposite side edges, said sheet including an opening in a medial location to define front and rear panels on opposite sides of the opening so that said sheet is adapted to be positioned on a wearer with the wearer's head extending through said opening with the front and rear panels respectively overlying the chest and back of the wearer,
- at least one pocket means located in each of said respective front and rear panels and defining respective cavities,
- a sealed pouch adapted to be inserted within each of said respective pocket means, said pouch including an inlet means defining a channel in fluid communication with the interior of said pouch and an outlet means defining a second channel in fluid communication with the interior of said pouch,
- a plurality of macrocapsules disposed within said pouch, said macrocapsules containing a temperature stabilizing means,
- a channelling means for holding said macrocapsules in a preselected position within said pouch,
- whereby when a heat transfer fluid is circulated through said pouch and around said macrocapsules, heat is transferred from the macrocapsules to the fluid and is thereby removed from the vest.

16. The vest according to claim 15 wherein said channelling means comprises a matrix.

17. The vest according to claim 16 wherein said matrix is honeycomb shaped.

18. The vest according to claim 16 wherein said matrix further includes openings in at least some of its side walls and wherein said openings are smaller than the diameter of said macrocapsules,
- whereby the heat transfer fluid moves freely between adjacent openings in the matrix, but the macrocapsules are retained in position.

19. The vest according to claim 15 wherein said temperature stabilizing means comprises a phase change material.

20. The vest according to claim 19 wherein said phase change material comprises a paraffinic hydrocarbon selected form the group consisting of n-Octacosane, n-Heptacosane, n-Hexacosane, n-Pentocosane, n-Tetracosane, n-Tricosane, n-Docosane, n-Homeicosane, n-Eicosane, n-Nonadecane, n-Octadecane, n-Heptadecane, n-Hexadecane, n-Pentadecane, n-Tetradecane, and n-Tridecane.

* * * * *